United States Patent
Lee et al.

(10) Patent No.: US 9,190,633 B2
(45) Date of Patent: Nov. 17, 2015

(54) POUCH TYPE LITHIUM SECONDARY BATTERY

(75) Inventors: Sang-Ho Lee, Cheonan-si (KR);
Sang-Do Heo, Busan (KR)

(73) Assignee: Samsung SDI Co., Ltd., Yongin-si (KR)

( * ) Notice: Subject to any disclaimer, the term of this patent is extended or adjusted under 35 U.S.C. 154(b) by 72 days.

(21) Appl. No.: 12/487,877

(22) Filed: Jun. 19, 2009

(65) Prior Publication Data

US 2009/0258290 A1    Oct. 15, 2009

Related U.S. Application Data

(63) Continuation of application No. 11/020,697, filed on Dec. 27, 2004, now abandoned.

(30) Foreign Application Priority Data

Dec. 26, 2003  (KR) .................... 10-2003-0097353

(51) Int. Cl.
*H01M 2/02* (2006.01)
*H01M 2/08* (2006.01)
*H01M 10/42* (2006.01)

(52) U.S. Cl.
CPC ............ *H01M 2/0275* (2013.01); *H01M 2/021* (2013.01); *H01M 2/0267* (2013.01); *H01M 2/08* (2013.01); *H01M 10/425* (2013.01); *H01M 2/0217* (2013.01); *H01M 2/0287* (2013.01); *H01M 2200/106* (2013.01)

(58) Field of Classification Search
None
See application file for complete search history.

(56) References Cited

U.S. PATENT DOCUMENTS

| | | | | |
|---|---|---|---|---|
| 5,436,089 A | * | 7/1995 | Fedele ........................ | 429/156 |
| 5,939,792 A | * | 8/1999 | Ishikawa ..................... | 257/790 |
| 6,042,966 A | * | 3/2000 | Cheu ........................... | 429/163 |
| 6,207,271 B1 | * | 3/2001 | Daroux et al. .............. | 428/344 |
| 6,232,013 B1 | * | 5/2001 | Clarke et al. ................ | 429/100 |
| 6,319,630 B1 | | 11/2001 | Hasegawa et al. | |
| 6,368,744 B1 | * | 4/2002 | Hatazawa et al. ........... | 429/163 |
| 7,129,001 B2 | * | 10/2006 | Munenaga et al. ......... | 429/152 |

(Continued)

FOREIGN PATENT DOCUMENTS

| | | |
|---|---|---|
| JP | 11-297280 | 10/1999 |
| JP | 2000-138040 | 5/2000 |

(Continued)

OTHER PUBLICATIONS

Final Office Action of Feb. 26, 2010 in U.S. Appl. No. 11/020,697.
Non-Final Office Action of Sep. 18, 2009 in U.S. Appl. No. 11/020,697.
Final Office Action of May 18, 2009 in U.S. Appl. No. 11/020,697.
Non-Final Office Action of Dec. 17, 2008 in U.S. Appl. No. 11/020,697.

(Continued)

*Primary Examiner* — Alix Eggerding
(74) *Attorney, Agent, or Firm* — H.C. Park & Associates, PLC

(57) ABSTRACT

The present invention is related to a pouch type lithium secondary battery. The pouch type lithium secondary battery according to the present invention may comprise an electrode assembly including a positive electrode, a separator and a negative electrode, and a pouch having a groove for receiving the electrode assembly and upper and lower portions of which are fused to each other around the groove to form flange-shaped edges. In particular, the edges may be at least partially covered at ends thereof with insulating material. As a result, a short circuit between a metal foil of the pouch and the negative electrode of the battery can be prevented, and corrosion of the battery may be also prevented.

11 Claims, 7 Drawing Sheets

(56) References Cited

U.S. PATENT DOCUMENTS

| | | | |
|---|---|---|---|
| 7,524,578 B2* | 4/2009 | Somatomo et al. | 429/174 |
| 2001/0016979 A1* | 8/2001 | Kida et al. | 29/623.2 |
| 2003/0017388 A1* | 1/2003 | Furusaki | 429/162 |
| 2003/0118900 A1* | 6/2003 | Otohata | 429/162 |
| 2004/0029001 A1* | 2/2004 | Yamazaki et al. | 429/176 |
| 2005/0037259 A1* | 2/2005 | Maruyama | 429/176 |
| 2005/0084749 A1* | 4/2005 | Hwang et al. | 429/127 |

FOREIGN PATENT DOCUMENTS

| | | | |
|---|---|---|---|
| JP | 2000-208111 | | 7/2000 |
| JP | 2001-250516 | | 9/2001 |
| JP | 2002-056839 | | 2/2002 |
| JP | 2003-338281 | | 11/2003 |
| WO | WO03/007401 | * | 1/2003 |
| WO | WO03/096446 | * | 11/2003 |

OTHER PUBLICATIONS

Non-Office Action of U.S. Appl. No. 11/020,697 issued on Nov. 12, 2010.

Non-Final Office Action of U.S. Appl. No. 11/020,697 issued on Apr. 18, 2011.

Non-Final Office Action of U.S. Appl. No. 11/020,697 issued on Oct. 19, 2011.

Final Office Action issued on Feb. 17, 2012 in U.S. Appl. No. 11/020,697.

Final Office Action for U.S. Appl. No. 11/020,697, dated May 30, 2013.

Non-Final Office Action dated Jan. 23, 2013 issued for U.S. Appl. No. 11/020,697.

Non-Final Office Action for U.S. Appl. No. 11/020,697 issued on Sep. 19, 2013.

Final Office Action dated Feb. 11, 2014 in U.S. Appl. No. 11/020,697.

* cited by examiner

POUCH TYPE LITHIUM SECONDARY BATTERY

CROSS-REFERENCE TO RELATED APPLICATIONS

This application is a continuation of U.S. patent application Ser. No. 11/020,697, filed on Dec. 27, 2004, and claims priority to Korean Patent Application No. 2003-97353, filed on Dec. 26, 2003, in the Korean Intellectual Property Office, the disclosure of which are both incorporated herein in its entirety by reference.

FIELD OF THE INVENTION

The present invention is related to a lithium secondary battery. Specifically, the present invention is related to a pouch type lithium secondary battery where the electrode structure comprising a positive electrode, a negative electrode and a separator, is received in a pouch.

BACKGROUND

In general, lithium secondary batteries use a non-aqueous electrolyte due to the reactivity of lithium with moisture. The non-aqueous electrolyte may be a solid polymer containing a lithium salt or a liquid phase with a dissociated lithium salt in an organic solvent. The lithium secondary battery may be classified as a lithium metal battery, a lithium ion battery using a liquid electrolyte, or a lithium ion polymer battery using a solid polymer electrolyte.

There is no problem of organic electrolyte leakage in a pure solid type lithium ion polymer battery, and a gel type lithium ion polymer battery can also prevent the problem of electrolyte leakage in a simpler manner than the lithium ion battery using liquid electrolyte. For example, the lithium ion polymer battery can use a pouch instead of a metal can as a receptacle of an electrode assembly.

In general, the pouch may comprise a multilayer film including a metal foil layer and a plastic layer which covers the metal foil layer. Using such a pouch makes it possible to reduce the weight of a battery as compared with using a metal can. Usually, aluminum is used as metal constituting a foil in the multilayer film pouch. A polymer layer forming an inner layer of the pouch film protects the metal foil against an electrolyte and simultaneously prevents a short circuit among a positive electrode, a negative electrode and electrode tabs.

In order to manufacture a pouch type lithium secondary battery, an electrode assembly, which is formed by laminating or laminating and then winding a positive electrode, separator and negative electrode, is placed into a pouch in a provisionally sealed state. Subsequently, an upper pouch film and a lower pouch film are thermally fused to each other in open edge portions of the pouch to form a bare cell battery of a sealed pouch type.

Accessories or structures such as a protecting circuit module (PCM) or a positive temperature coefficient (PTC), not shown in the Figures described below, are attached to the bare cell battery to form a core pack battery. By coupling this core pack battery within a hard case, a complete hard pack battery is produced. The hard case can be formed by using polypropylene resin and so forth without separately providing a circuit or an electrical conductor portion on its inner side, but the inside of the hard case may be provided with a separate accessory circuit or other electrical conductor portion dependent on a device for which the battery is used. In some cases, the core pack battery may be used in such a manner that it is directly attached to a product without a separate hard case.

Referring to FIGS. 1 and 2, flange-shaped lateral edges 23 which have been fused at the sealing of a pouch are shown in a state that they are folded toward the front, that is, in a direction forming a groove on both left and right sides of a core pack battery 100 having an approximately rectangular shape. Folding the lateral edges 23 reduces the battery in size by as much as the widths of the lateral edges 23 in order to remove unused space in the bare cell battery which is formed by fusing the edges to seal the pouch.

A protecting circuit module and other structure are connected to the battery around an upper side, from which electrode tabs 37, 38 are drawn out, of four sides which forms a rectangle when viewed from the front of the core pack battery 100. Also, the electrode tabs 37, 38 are bent once or twice as shown in FIG. 2. As the electrode tabs are bent, an upper side edge 23' from which the electrode tabs are drawn out in the sealed pouch, the protecting circuit module 51 is located in an empty space defined by one wall surface 56 forming the groove 54 on the side from which the electrode tabs are drawn out, and both the left and right edges of the pouch folded toward the groove, so that the length of the whole battery can be reduced.

Even if both the lateral edges 23 of the pouch are in a folded state, the metal foil constituting an intermediate layer of the pouch film is still exposed outside in end portions of the edges 23. Since an electrical conductor portion of the protecting circuit module 51 is positioned spatially close to the folded edges 23 of the pouch when the core pack battery 100 has been formed, it is highly likely to be electrically connected to the edges 23. If the electrical conductor portion of the protecting circuit module 51 is connected to the negative electrode of the battery in any manner, a possibility of a short circuit between the copper of the negative electrode and the aluminum foil is increased.

In addition, a short circuit between the metal foil of the pouch film and the negative electrode of the battery may occur by way of a circuit portion or other electrical conductor within the hard case or a battery box of a product for which the battery is used when the core pack battery is directly inserted into the hard case or the battery box. Otherwise, electrical connection may be established by a path passing through the metal foil of the pouch film, the electrical conductor of the protecting circuit module, the electrical conductor of the hard case or the battery box, and the negative electrode of the battery.

Once aluminum constituting the metal foil of the pouch film is connected to a copper collector of the negative electrode, the aluminum foil may be subject to corrosion. In particular, the corrosion 10 of the metal foil may be accelerated under an environment where leaked electrolyte component or moisture exists around the negative electrode tab in the pouch.

If the metal foil serving as a barrier to moisture or oxygen continues to corrode, the polymer layer of the pouch film may prevent entrance of moisture and oxygen. The lowering of blocking capacity of the pouch may give rise to abnormality of the battery. That is, if an organic electrolyte of a gel type electrolyte separator evaporates or foreign moisture or oxygen intrudes into the battery, abnormal phenomena such as swelling occur, which results in the lifetime of the battery being discarded, deteriorated or shortened.

In order to overcome these problems a method where the lateral edges are twice folded into the form of a flange by folding on both left and right sides of a core pack battery has been proposed. First, both the lateral edges 23 of the pouch are folded into halves to form overlapped edge portions 23, as designated by FIG. 3. As a result, the width of the edges is reduced by half and ends 231 of the edges come into contact with portions of sidewall surfaces 541 constituting the groove 54. Subsequently, the overlapped edge portions are folded again toward the groove 54 resulting in the ends 231 becoming invisible to the exterior while being interposed between the edges 23 and the sidewall surfaces 541 constituting the groove 54.

However, the protecting circuit module (not shown), which is connected to the electrode tabs 37, 38 when they are bent, is located in a region which is an empty space not occupied by the groove 54 of the pouch. Consequently, even if the edges 23 are folded twice, the ends 231 of the edges are not shielded by the sidewall surfaces 541 of the groove 54. In other words, the ends 231 of the edges are still exposed in that space, so that they are highly likely to be connected to the protecting circuit module or 10 the like, located in that space or elsewhere.

SUMMARY OF THE INVENTION

An object of the present invention is to provide a pouch type lithium secondary battery capable of preventing edge ends, in which a metal foil comprising at least one layer of a multilayer pouch film is exposed, from being electrically connected to other metals forming electrodes via a protecting circuit module, an electrical conductor within a hard case. That is, the present invention aims to provide a pouch type lithium secondary battery, which can prevent the metal foil from being subject to corrosion due to a short circuit between the metal foil and other metals.

In one aspect, there is provided a pouch type lithium secondary battery, which comprises an electrode assembly which comprises a positive electrode, a separator and a negative electrode; and a pouch having a groove for receiving the electrode assembly and upper and lower portions of which are fused to each other around the groove to form flange-shaped edges, where the edges are at least partially covered at ends with an insulating material.

In another aspect of the present invention, the insulating material may be constructed in such a manner that it covers the whole ends of the edges in the pouch, excluding a portion from which electrode tabs are drawn out, and may be formed by an adhesive tape or the like.

In a further aspect of the present invention, the pouch may have an approximately rectangular shape when viewed from a direction of the thickness of the groove, and the edges on both sides of the pouch may be folded in a direction forming the groove. If the adhesive tape constituting the insulating material is attached over a part of its width to the edges and is attached over the rest of its width to sidewall surfaces or a base surface of the groove with the ends of the edges as its starting point, the ends of the edges may be covered with the adhesive tape and simultaneously the folded edges can come to close contact with the groove of the pouch.

In another aspect of the present invention, when the edges on both sides of the rectangular-shaped pouch are folded twice, that is, are primarily folded into halves having half width and are secondarily folded toward the groove, the insulating material has only to be attached to the ends of the edges in portions where a side for installing the protecting circuit module meets two lateral sides of the pouch so as to prevent a short circuit between the electrical conductor portion of the protecting circuit module and the metal foil of the pouch. In general, the side for installing the protecting circuit module may be the same as the side from which the electrode tabs are drawn out.

DETAILED DESCRIPTION OF THE INVENTION

Figure 1:
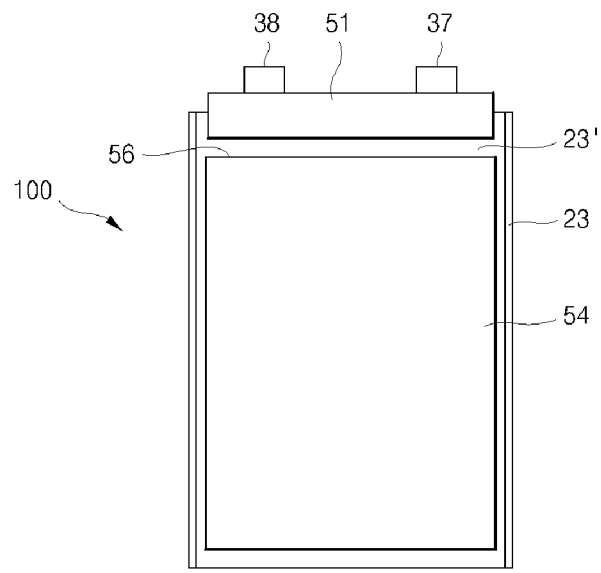
FIG. 1 is an illustration of a front view of one example of a core pack battery forming an approximately rectangular shape when viewed from a direction of a surface on which a groove for receiving an electrode assembly is formed.
Figure 2:
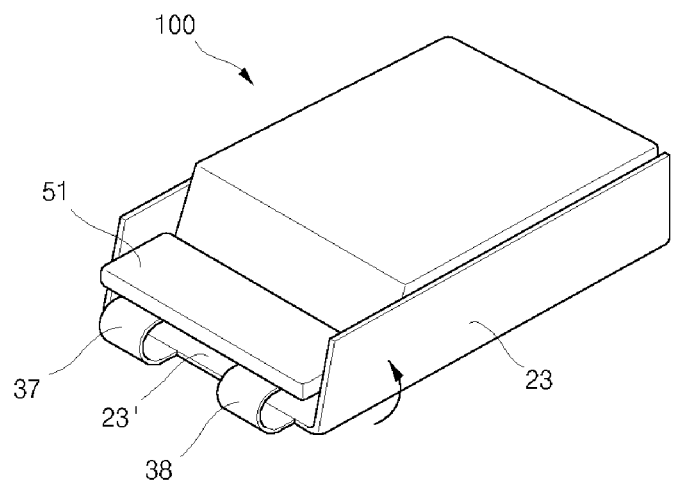
FIG. 2 is an illustration of a perspective view of the example in FIG. 1, which shows only a separate portion to which a protecting circuit module is connected.
Figure 3:
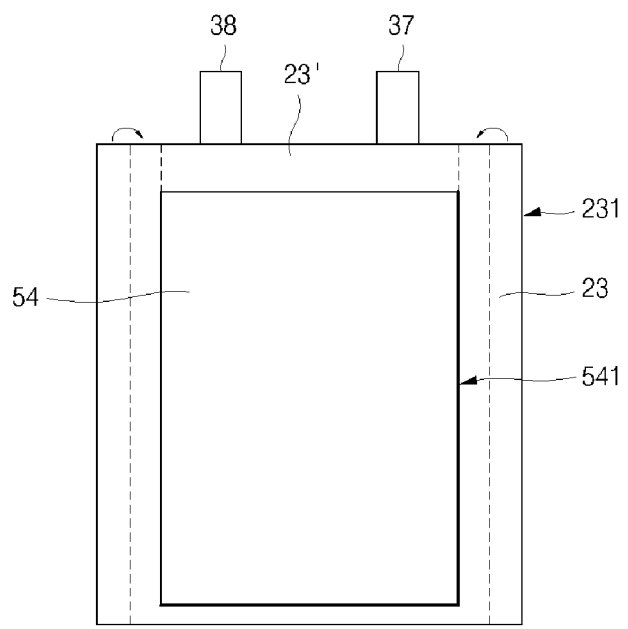
FIG. 3 a view for explaining a way to fold flange-shaped edges twice on both left and right sides of a pouch.
Figure 4:
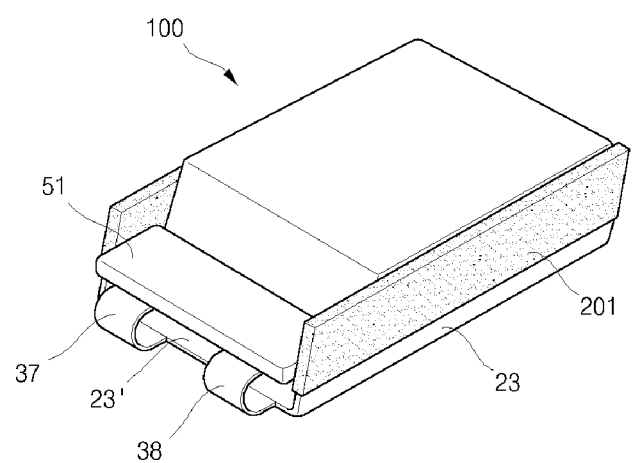
FIG. 4 is a schematic perspective view showing a state in which a protecting circuit module is connected to a bare cell battery during the formation of a lithium secondary battery in accordance with one embodiment of the present invention.

Referring to FIG. 4, which illustrates an embodiment of the present invention, a rectangular pouch film, which is generally formed as an integral body, is folded and bonded in the middle with respect to a longitudinal direction of one side to create upper and lower portions of the pouch. By a pressing work, the lower portion is formed with a groove in which an electrode assembly can be received. Here, the pouch film has a multilayer structure comprising a metal foil, such as aluminum, and polymer films such as a polypropylene resin film coated on upper and lower surfaces of the metal foil.

In general, the electrode assembly may be formed in the shape of a jelly roll by laminating a positive electrode, a separator and a negative electrode to produce a multilayer film and winding the multilayer film in a scroll form. The separator may be attached to an outer or inner electrode surface of the jelly roll during the formation of the jelly roll in order to prevent a short circuit between the positive electrode and the negative electrode.

Here, the positive electrode may be formed by a method in which a positive electrode collector made of a metal sheet having excellent electrical conductivity such as an aluminum foil is coated on both its surfaces with a positive electrode coating portion main ingredient of which is a lithium-based oxide. In the positive electrode, a positive electrode tab is electrically connected to a region of the positive electrode collector, which is not formed with the positive electrode coating portion.

The negative electrode can be formed by coating both surfaces of a negative electrode collector made of a conductive metal sheet such as a copper foil with a negative electrode coating portion containing carbon material as a main ingredient. The coating can be conducted in such a manner that an electrical conductor, a binder and other components are mixed to produce active material in a paste phase and the negative electrode collector is thinly covered with the active material in a paste phase. In the negative electrode, a negative electrode tab is also electrically connected to a region of the negative electrode collector, which is not formed with the negative electrode coating portion.

In the electrode assembly having a shape of a wound jelly roll, the positive and negative electrode tabs are arranged side by side, are projected from the jelly roll in a direction perpendicular to the winding direction of the jelly roll, and are drawn out from the pouch through one side of the sealed pouch.

In general, the electrode tabs assume a form of a metal tab mostly made of aluminum, copper or nickel. These electrode tabs must have thickness and dimensions enough to flow an electric current there through without a notable voltage drop.

In order to strengthen adhesion between the metal constituting the electrode tabs and the polymer film on an inner surface of the pouch during the sealing of the pouch, a specific component can be contained in the polymer film surface or a separate tape (not shown) containing the specific component can be previously attached to a portion of the pouch, to which the electrode tabs are adhered, before the sealing of the pouch. At this time, the tape also serves to prevent a short circuit between the both the electrode and the electrode tabs.

Usually, processes of injecting an electrolyte without sealing a part of the sealed surface, provisionally sealing the sealed surface after the injection of the electrolyte, and degassing gases generated in the subsequent processes are interposed in the process of sealing.

In another embodiment, the positive and negative electrodes and the electrode tabs may be arranged while having different polarities.

By closely contacting the edge around the lower groove in which the electrode assembly lies with the corresponding edge of the upper portion of the pouch film, and then heating and pressing the closely contacted portions of the edges, the inner polymer films of the edges are fused to each other to achieve the sealing of the pouch and thusly to form a bare cell battery. At this time, the edges 23, 23' take a shape of a flange on at least three sides of four sides around the groove 54 when the upper and lower portions of the pouch are in a fused state.

In the pouch having an approximately rectangular shape when viewed without consideration of the thickness of the groove 54, an insulating tape 201 may be attached to the ends of the edges 23 along both lateral sides connected to a side from which the electrode tabs 37, 38 are drawn out, so that the metal foil of the ends is not exposed. The edges 23 of both of the lateral sides may be then folded in a forming direction of the groove. Finally, structures such as a protecting circuit module 51, a positive temperature coefficient (PTC) may be attached to the positive and negative electrode tabs 37, 38 of the bare cell battery in a conventional manner to form a core pack battery 100. Here, an electrical conductor portion of the protecting circuit module 51 may be still positioned spatially close to the folded edges 23 of both the lateral sides of the pouch.

Since the metal foil at the ends of the edges 23 may be shielded by the insulating tape 201, however, there is no fear of electrical connection of the metal foil with the electrical conductor portion of the protecting circuit module 51. When the core pack battery 100 is later coupled within a hard case having an electrical conductor portion such as a separate accessory circuit or the like in its inside, the insulating tape 201 also prevents the metal foil from being electronically connected at the ends of the forked edges 23 of the pouch with the electrical conductor portion. Accordingly, there is no fear of a short circuit between the metal foil and the negative electrode of the battery through the electrical conductor portion within the hard case.

Figure 5:
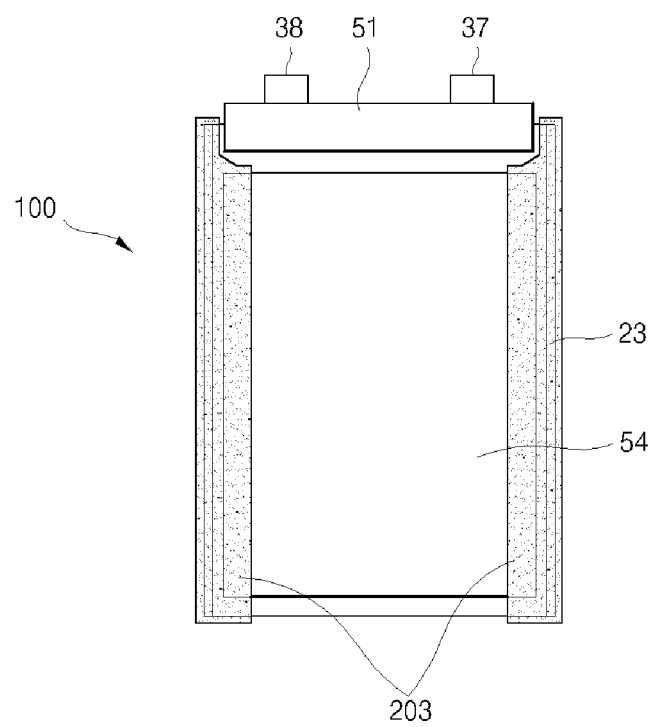
FIG. 5 is a schematic front view of a core pack battery in accordance with another embodiment of the present invention.

Referring to FIG. 5, which illustrates a further embodiment of the present invention, the process of attaching the tape may not performed until the process of folding the edges has been completed. Also, starting from the ends of the edges 23, at which the metal foil may be exposed, a tape 203 may be attached over one half width to the edges and may be attached over the other half width to sidewall surfaces or a base surface constituting the groove 54. As a result, the tape 203 may prevent the exposed metal foil from being electrically connected to other electrical conductor portions and simultaneously serves to bring the folded edges 23 into close contact with the groove and thusly to neatly finish external appearance. This may overcome the problem created by the folded edges to the subsequent processes, for example, the process of inserting the core pack battery 100 into the hard case.

Figure 6:
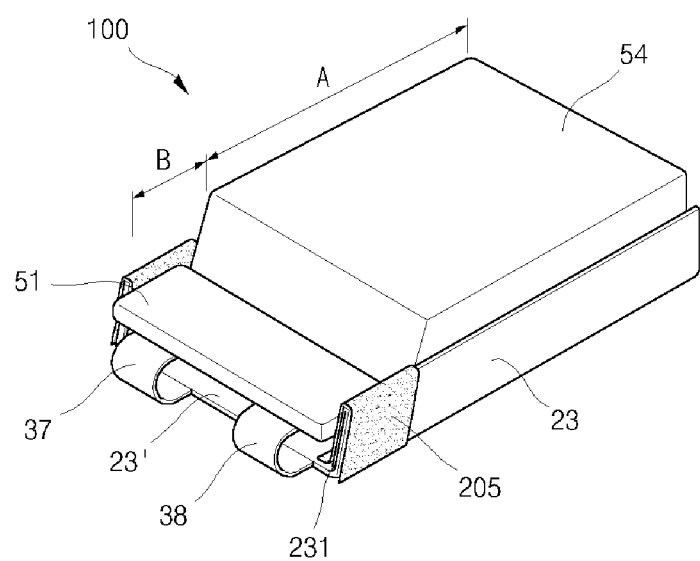
FIG. 6 is a schematic perspective view of a core pack battery in accordance with still another embodiment of the present invention.

Referring to FIG. 6, which illustrates another embodiment of the present invention, the edges 23 of both the lateral sides of the pouch may be folded twice. Therefore, in a portion A formed with the groove 54 along both the lateral sides of the pouch, the metal foil of the ends 231 of the edges is not exposed. However, in both upper corner portions B of the pouch, that is, portions defining a space for locating the protecting circuit module 51 in the core pack battery 100, the ends 231 of the edges 23 may be covered with an insulating tape 205. Consequently, even if the electrical conductor portion of the protecting circuit module 51 is positioned close to the ends 231 of the edges, there is no fear of a short circuit between the metal foil of the pouch and the electrical conductor portion of the protecting circuit module. In this embodiment, since the ends 231 are not exposed in most part of the edges and the insulating tape 205 may be attached to only both the upper corners in which the metal foil is exposed, the tape attachment work is simpler than in other embodiments.

Figure 7:
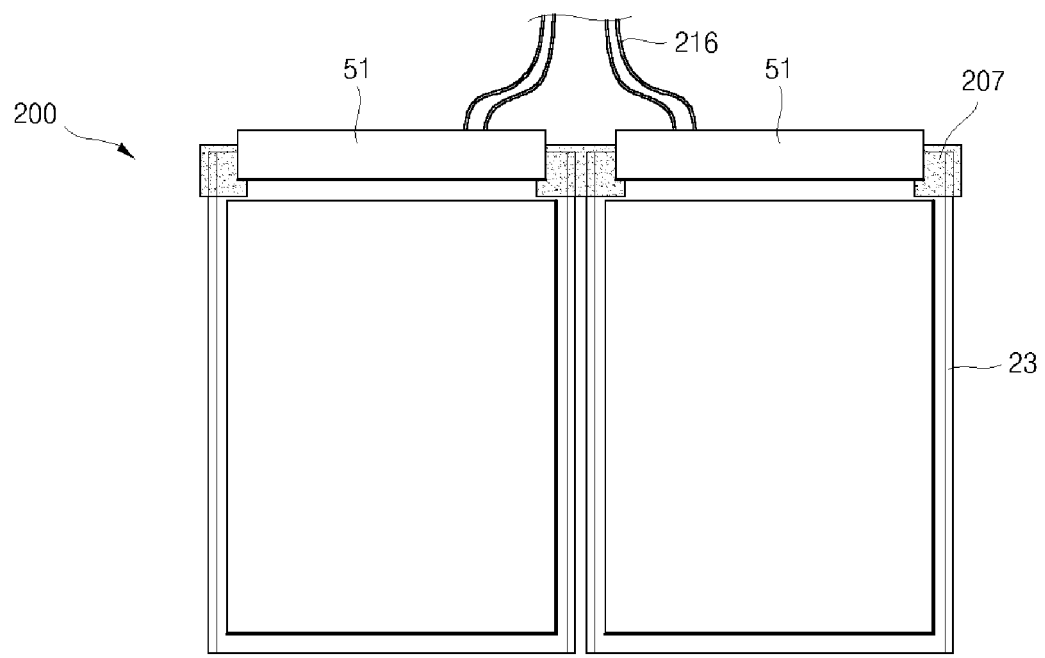
FIG. 7 is a front view of a lithium secondary battery in accordance with still yet another embodiment of the present invention.

Referring to FIG. 7, which illustrates a further embodiment of the present invention, two core pack 200 may be coupled to each other to form one battery. Both left and right edges of each core pack 200 may be folded twice. Similar to FIG. 6 as described above, where the battery may be formed by one core pack, an insulating tape 207 may be attached to both upper corners of each core pack 200 in this embodiment. Thus, the tape may prevent the metal foil exposed at the corners from being electrically connected to the electrical conductor portion of the protecting circuit module 51 adjacent thereto. Reference numeral "216" designates electrical conductive wires coming out of the two core packs.

Figure 8:
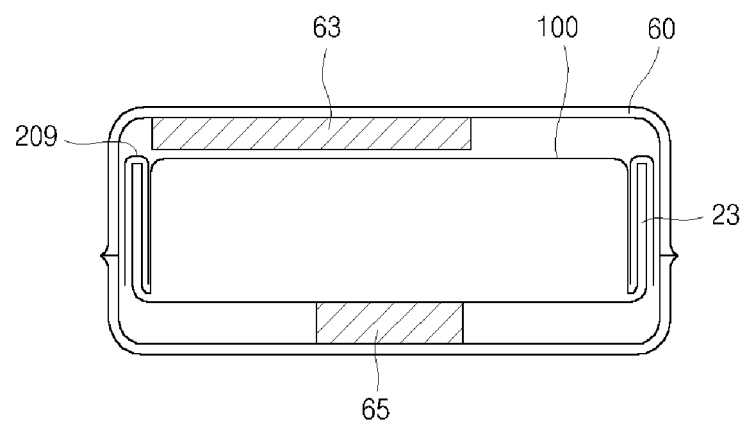
FIG. 8 is schematic sectional view of a hard pack battery formed according to the present invention taken along a plane perpendicular to both the left and right sides of the pouch at which the edges are formed.

Referring to FIG. 8, which illustrates yet another embodiment of the present invention, an accessory circuit 63 may be further provided on an inner surface of the hard case 60 opposite to a lower portion of the core pack battery 100, which may be formed with the groove. Regardless of whether the accessory circuit 63 exists, the manner of constructing the accessory circuit may be determined by characteristics of the electronic device for which the battery may be used. Most of an inner space of the hard case 60 may be fixed with the core pack battery 100 including the electrode assembly. An upper surface of the core pack battery 100 may be adhered to the inner surface of the hard case 60 by a double-faced tape 65, so that the core pack battery 100 can be securely mounted to the hard case.

The ends of both edges 23 of the pouch, which are folded in a forming direction of the groove in one embodiment of the present invention, may be positioned spatially close to an electrical conductor portion of the accessory circuit 63 on the inner surface of the hard case 60. However, the ends of the edges have been already covered with the insulating tape 209. Accordingly, electrical connection between the metal foil of the pouch and the electrical conductor portion may be prevented even if the ends of the edges come to contact with the electrical conductor portion on the inner surface of the hard case 60, and a short circuit between the metal foil and the negative electrode of the battery is also prevented even though the negative electrode of the battery is connected to the electrical conductor portion.

According to the present invention, as described above, the insulating tape may be attached to places where the ends of the edges of the pouch are exposed so as not to bring the ends into direct contact with other parts constituting the battery, thereby preventing a short circuit between the metal foil of the pouch and the negative electrode of the battery. The present invention may overcome the problem of the metal foil being incapable of being able to serve as a barrier to moisture or oxygen due to the electrical connection of the metal coil with the negative electrode and thus the corrosion of the metal foil.

What is claimed is:

1. A pouch type lithium secondary battery, comprising:
   an electrode assembly comprising a positive electrode, a separator, a negative electrode, a positive electrode tab connected to the positive electrode, and a negative electrode tab connected to the negative electrode;
   a pouch comprising a metal foil and polymer films disposed on opposing sides of the metal foil, the pouch also comprising a first region that forms a space in which the electrode assembly is disposed and a second region to seal the first region, the second region comprising:
      first and second side regions disposed on at least two sides of the space and folded toward the space;
      a third side region connecting the first and second side regions, the third side region remaining unfolded and disposed perpendicular to the first and second side regions;
   a protective circuit module disposed on the third side region; and
   an electrically insulating adhesive tape disposed on the first and second side regions,
   wherein:
      portions of the metal foil are exposed from the polymer films along two edges of each of the first and second side regions;
      the tape is adhered so as to directly contact the exposed portions of the metal foil by an adhesive of the tape;
      the positive electrode tab and the negative electrode tab extend outside the pouch from between the polymer films and are bent to contact the protective circuit module; and
      the tape is disposed only between the protective circuit module and an immediately adjacent portion of the first side region and only between the protective circuit module and an immediately adjacent portion of the second side region.

2. The lithium secondary battery of claim 1, wherein the pouch has an approximately rectangular shape in plan view,
   wherein the first and second side regions are folded once towards the space, and
   wherein the tape is disposed on outer surfaces of the first and second side regions, and is disposed on a portion of the first region of the pouch.

3. The lithium secondary battery of claim 1, wherein the pouch has an approximately rectangular shape in plan view,
   wherein the second region of the pouch comprises a first side region and a second side region, the first side region being disposed on a first side of the space and folded twice towards the space, and the second side region being disposed on a second side of the space that is opposite the first side of the space and folded twice towards the space, and
   wherein the insulator is disposed at a facing portion of the first side region and a facing portion of the second side region, the facing portion of the first side region and the facing portion of the second side region facing each other without the space disposed therebetween.

4. The lithium secondary battery of claim 1, wherein the pouch has an approximately rectangular shape in plan view, wherein,
   portions of the metal foil are exposed from the polymer films along three edges of each of the first and second side regions.

5. The lithium secondary battery of claim 1, wherein the second region is disposed on three sides of the space.

6. A lithium secondary battery pack, comprising:
   a first lithium secondary battery and a second lithium secondary battery coupled to the first lithium secondary battery, each of the first lithium secondary battery and the second lithium secondary battery comprising:
   an electrode assembly comprising a positive electrode, a separator, a negative electrode, a positive electrode tab connected to the positive electrode, and a negative electrode tab connected to the negative electrode;
   a pouch comprising a metal foil and polymer films disposed on opposing sides of the metal foil, the pouch having a first region that forms a space in which the electrode assembly is disposed and a second region to seal the first region, the second region comprising:
      first and second side regions disposed on at least two sides of the space and folded toward the space;
      a third side region connecting the first and second side regions, the third side region remaining unfolded and disposed perpendicular to the first and second side regions;
   a protective circuit module disposed on the third side region; and
   an electrically insulating adhesive tape disposed on each of the first and second side regions,
   wherein:
      portions of the metal foil are exposed from the polymer films along two edges of each of the first and second side regions;
      the tape is adhered so as to directly contact the exposed portions of the metal film by an adhesive of the tape;
      the positive electrode tab and the negative electrode tab extend outside the pouch from between the polymer films and are bent to contact the protective circuit module; and
      the tape is disposed only between the protective circuit module and an immediately adjacent portion of the first side region and only between the protective circuit module and an immediately adjacent portion of the second side region.

7. The lithium secondary battery of claim 6,
   wherein the second region of the pouch of the first lithium secondary battery and the second region of the pouch of the second lithium secondary battery each comprises a first side region and a second side region, the first side region being disposed on a first side of the space and folded twice towards the space, and the second side region being disposed on a second side of the space that is opposite the first side of the space and folded twice towards the space, and wherein the insulator is disposed at a facing portion of the first side region and a facing portion of the second side region, the facing portion of the first side region and the facing portion of the second side region facing each other without the space disposed therebetween.

8. The lithium secondary battery of claim 6, wherein a single piece of the tape is disposed on the facing portion of the first side region of the first lithium secondary battery and the facing portion of the second side region of the second lithium secondary battery.

9. An apparatus, comprising:
a case; and
a pouch type lithium secondary battery disposed in the case, the pouch type lithium secondary battery comprising:
   an electrode assembly comprising a positive electrode, a separator, a negative electrode, a positive electrode tab connected to the positive electrode, and a negative electrode tab connected to the negative electrode;
a pouch comprising a metal foil disposed between polymer layers, the pouch having a first region that forms a space in which the electrode assembly is disposed and a second region to seal the first region, the second region comprising:
   first and second side regions disposed on at least two sides of the space and folded toward the space;
   a third side region connecting the first and second side regions, the third side region remaining unfolded and disposed perpendicular to the first and second side regions;
a protective circuit module disposed on the third side region; and
an electrically insulating adhesive tape disposed on the first and second side regions,
wherein:
portions of the metal foil are exposed from the polymer films along two edges of each of the first and second side regions;
the tape is adhered so as to directly contact the exposed portions of the metal film by an adhesive of the tape, and is disposed between the case and the exposed portions of the metal foil;
the positive electrode tab and the negative electrode tab extend outside the pouch from between the polymer films and are bent to contact the protective circuit module; and
the tape is disposed only between the protective circuit module and an immediately adjacent portion of the first side region and only between the protective circuit module and an immediately adjacent portion of the second side region.

10. The apparatus of claim 9, further comprising an accessory circuit disposed in the case,
wherein the tape is disposed between the accessory circuit and the first and second side regions.

11. The apparatus of claim 10, further comprising double sided tape,
wherein the pouch type lithium secondary battery is coupled with the case via the double sided tape.

\* \* \* \* \*